US005766488A

United States Patent [19]
Uban et al.

[11] Patent Number: 5,766,488
[45] Date of Patent: Jun. 16, 1998

[54] METHOD AND APPARATUS FOR WATER TREATMENT

[75] Inventors: Stephen A. Uban, Stillwater; Richard C. Maxson, Maple Grove, both of Minn.; Ralph W. Holliday, Minden, Nev.; Mark E. Watson, Sturgridge, Mass.

[73] Assignee: United States Filter Corporation, Palm Desert, Calif.

[21] Appl. No.: 716,704

[22] Filed: May 7, 1996

Related U.S. Application Data

[63] Continuation-in-part of Ser. No. 241,657, May 12, 1994, Pat. No. 5,514,284.

[51] Int. Cl.⁶ ............................................. C02F 1/78
[52] U.S. Cl. .......................... 210/739; 210/744; 210/750; 210/760; 210/792; 210/192; 210/198.1; 210/205; 210/199; 210/218; 261/DIG. 42
[58] Field of Search .................. 210/709, 721, 210/744, 752, 760, 792, 86, 106, 129, 142, 192, 199, 203, 264, 274, 739, 750, 198.1, 205, 218; 261/DIG. 42

[56] References Cited

U.S. PATENT DOCUMENTS

| | | | |
|---|---|---|---|
| 3,510,001 | 5/1970 | Baer et al. | 210/192 |
| 3,699,776 | 10/1972 | La Raus | 210/192 |
| 4,029,578 | 6/1977 | Turk | 210/760 |
| 4,049,552 | 9/1977 | Arff | 210/760 |
| 4,060,484 | 11/1977 | Austin | 210/786 |
| 4,090,960 | 5/1978 | Cooper | 210/192 |
| 4,182,663 | 1/1980 | Vaseen | 210/760 |
| 4,317,732 | 3/1982 | Shoquist | 210/106 |
| 4,395,337 | 7/1983 | Ciepiela | 210/703 |
| 4,547,286 | 10/1985 | Hsuing | 210/738 |
| 4,619,763 | 10/1986 | O'Brien | 210/177 |
| 4,793,934 | 12/1988 | Thompson et al. | 210/715 |
| 4,849,115 | 7/1989 | Cole et al. | 210/748 |
| 4,898,672 | 2/1990 | Clifft et al. | 210/614 |
| 5,013,453 | 5/1991 | Walker | 210/721 |
| 5,032,294 | 7/1991 | Schulz | 210/795 |
| 5,106,497 | 4/1992 | Finnegan | 210/192 |
| 5,120,435 | 6/1992 | Fink | 210/192 |
| 5,145,585 | 9/1992 | Coke | 210/760 |
| 5,167,840 | 12/1992 | Jaccarino | 210/274 |
| 5,180,499 | 1/1993 | Hinson et al. | 210/721 |
| 5,234,600 | 8/1993 | Kupke | 210/744 |
| 5,266,215 | 11/1993 | Engelhard | 210/748 |
| 5,273,664 | 12/1993 | Schultz | 210/199 |

FOREIGN PATENT DOCUMENTS

| | | | |
|---|---|---|---|
| 826 801 | 7/1975 | Belgium. | |
| 1 528 836 | 6/1968 | France. | |
| 2 096 947 | 3/1972 | France. | |
| 25 11 499 | 9/1976 | Germany | 210/192 |
| 28 12 794 | 9/1979 | Germany. | |

OTHER PUBLICATIONS

*Patent Abstracts of Japan*, vol. 14, No. 68, Feb. 8, 1990, Abstract No. C-0686, Ebara Jitsugyo KK, "Ozone Purifying Device of Water Tank," JP, A, 01 288395.

*Primary Examiner*—Neil McCarthy
*Attorney, Agent, or Firm*—Klarquist Sparkman, Campbell Leigh & Whinston, LLP

[57] ABSTRACT

An apparatus for treating water includes a vertically extending contact vessel, wherein water is contacted with ozone, and a return vessel which contains a column of water of a sufficient height to drive water through downstream solids separation stages. Ozone is removed from the water and the rate of ozone injection is monitored and automatically adjusted so that no great amount of ozone remains in water entering the solids separation stages. The ozone is generated in elongated elements that are cooled by the process water and that are positioned to serve as a static mixer for such water.

5 Claims, 3 Drawing Sheets

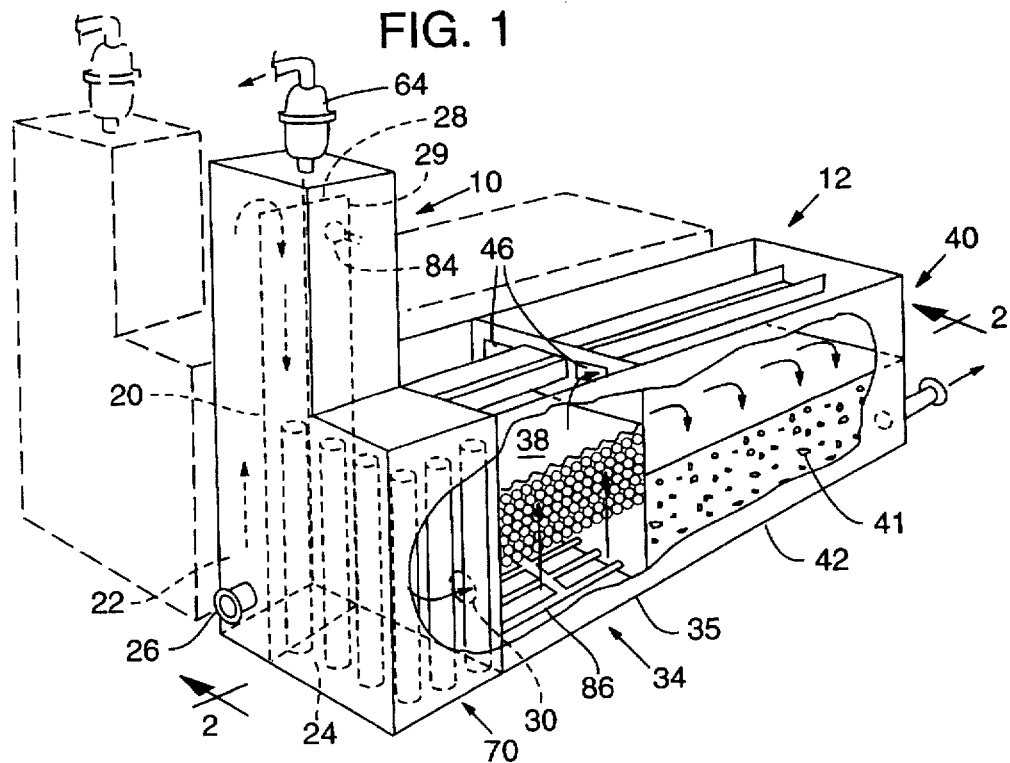
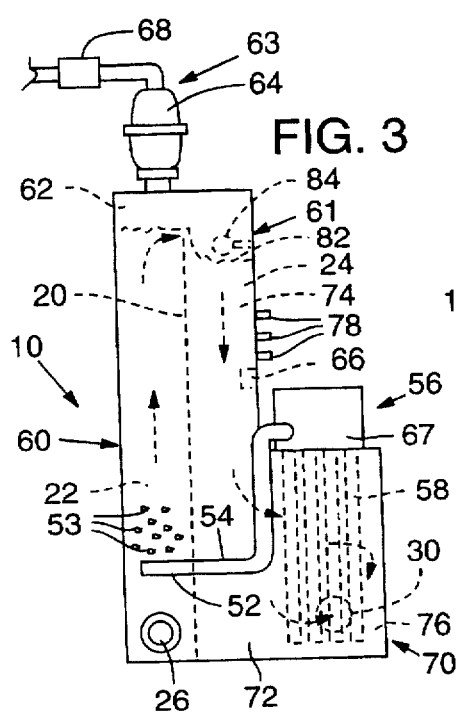
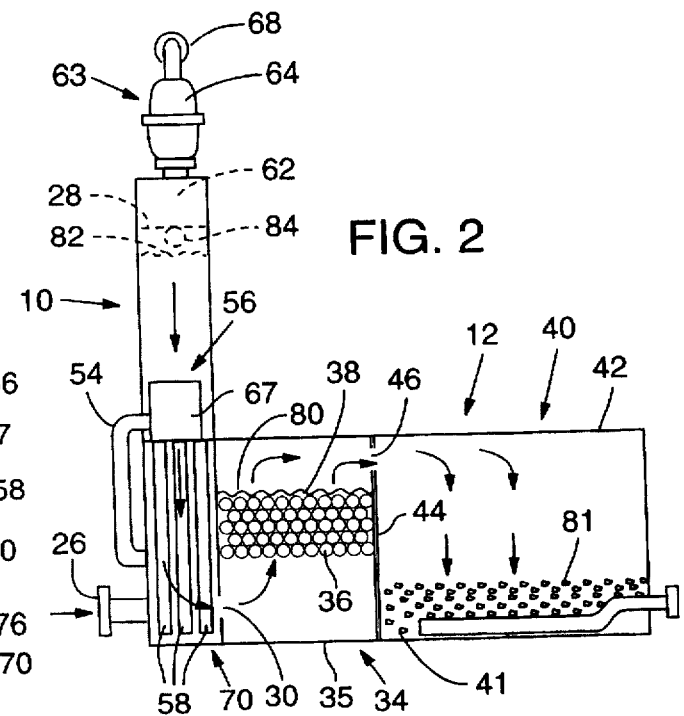

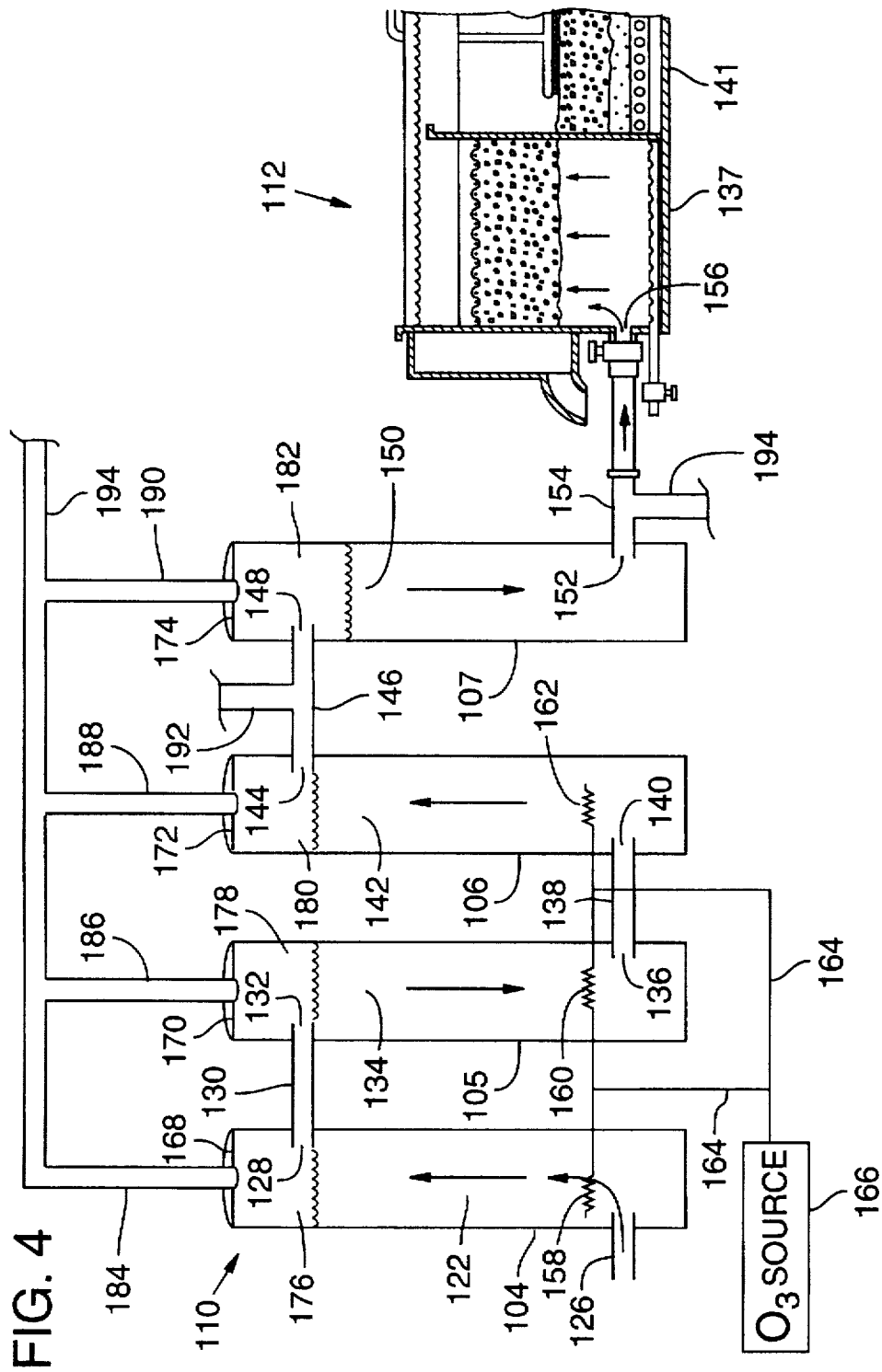

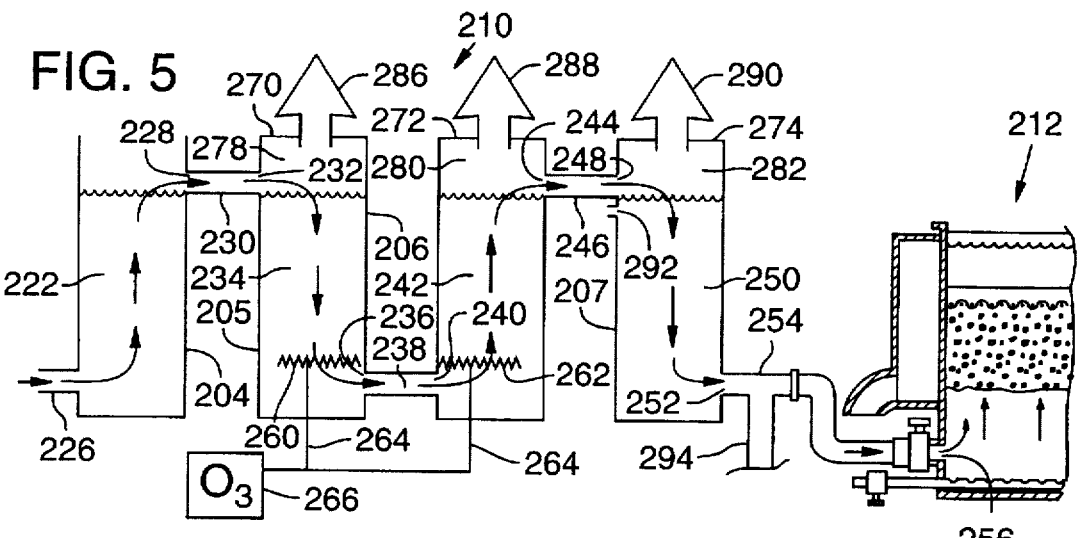
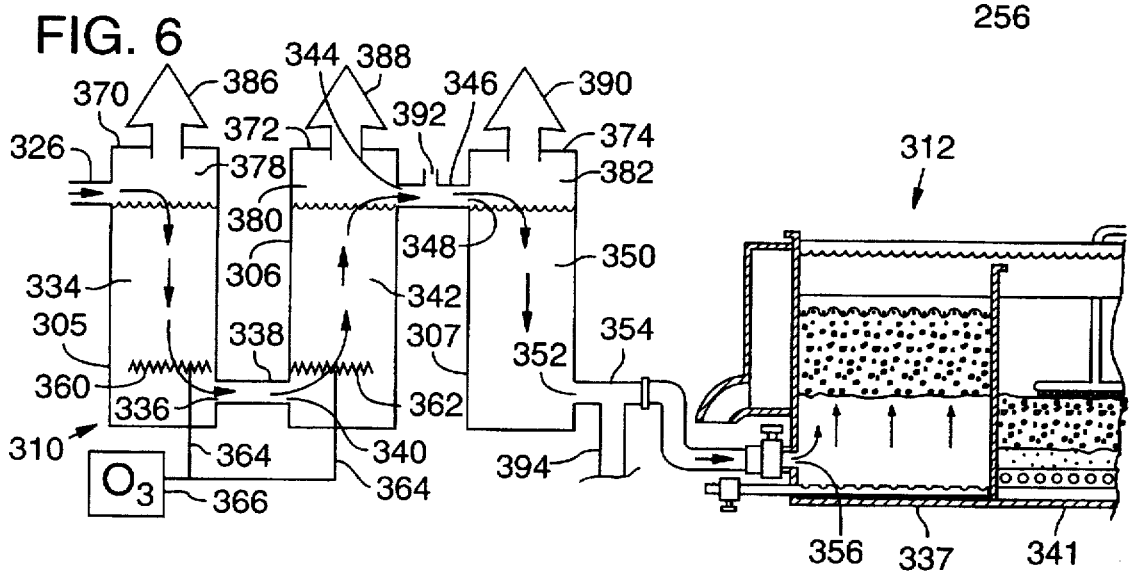
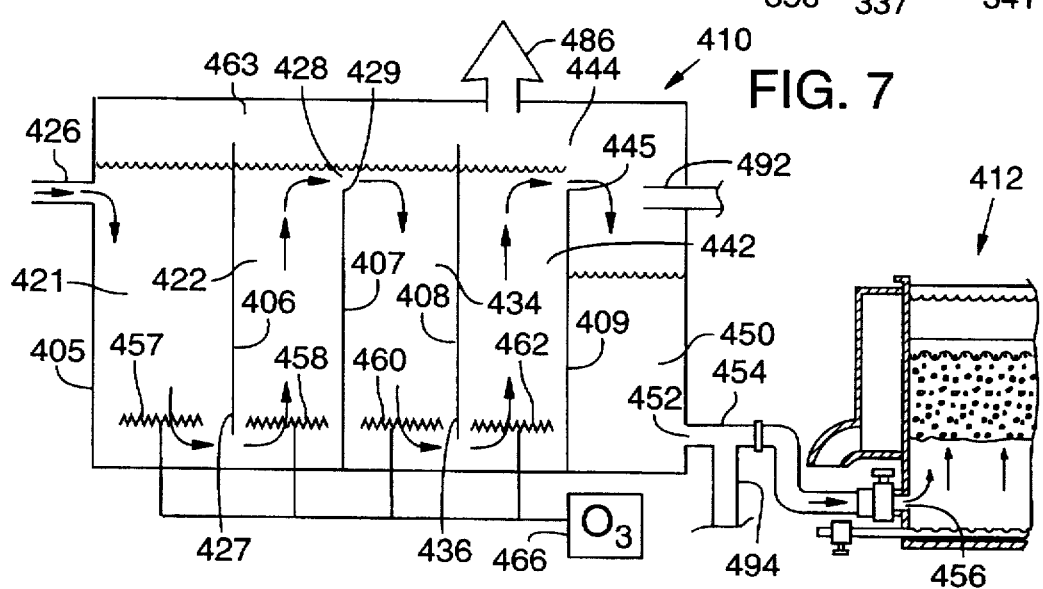

5,766,488

METHOD AND APPARATUS FOR WATER TREATMENT

This is a continuation-in-part of application Ser. No. 08/241,657, filed May 12, 1994, now U.S. Pat. No. 5,514,284.

SUMMARY OF THE INVENTION

The present invention relates to the purification of water which contains contaminants. More specifically, it relates to water purification wherein water is treated with ozone and is filtered to remove solids.

Over the years, numerous devices have been used to purify water by contact with ozone and/or by filtration. It has been a problem with such devices that they tend be bulky, particularly if ozonation equipment is added to a standard filter system. It has also been a problem that ozone generators produce heat which must be dissipated and that ozone-bearing water is corrosive to normal steel tankage.

A system where ozone generation is effectively integrated with a filtration process has now been discovered. In its various aspects, the system includes equipment that is compact, that cools the ozone generator, that allows standard steel tanks to be used for filtration operations, and that operates automatically.

One of the features disclosed is an apparatus wherein ozone generation tubes are submerged for cooling in the water being treated.

Another feature is the positioning of such ozone generation tubes upstream of filtration beds and downstream of the point where water treatment chemicals are added to the water. By properly arranging the tubes in an array, the tubes will serve as a static mixer. Water that passes through the array is agitated, thereby mixing the additive chemicals into the water prior to filtration.

An additional feature is the use of a tower upstream of a filtering apparatus to provide a hydraulic head that is sufficient to cause the water to flow through downstream filtering stages by gravity. Most advantageously, the tower comprises an upflow column alongside a return or downflow column, the two columns being joined at the top. With this arrangement, ozone can be injected into water in the upflow column and then removed from the water at the top of the columns. Ozone is thus removed from the process water before it enters the filtration system.

These and other features of the invention will be further understood with reference to the following description and drawings.

BRIEF DESCRIPTION OF THE DRAWINGS

In the drawings:

FIG. 1 is a perspective schematic view of a water treatment system according to the present invention;

FIG. 2 is a sectional view taken along line 2—2 of FIG. 1;

FIG. 3 is a front elevational view of the system shown in FIG. 1;

FIG. 4 is an elevational schematic view of a second water treatment system according to the present invention;

FIG. 5 is an elevational schematic view of a third water treatment system according to the present invention;

FIG. 6 is an elevational schematic view of a fourth water treatment system according to the present invention; and FIG. 7 is an elevational schematic view of a fifth water treatment system according to the present invention.

DETAILED DESCRIPTION

A filtration system according to the present invention is shown in the drawings, wherein the flow of water is illustrated by arrows. These drawings show an example of a system for treating a stream of water by contact with ozone in a gas contactor vessel 10. Solids are then removed by passing the stream of water through a two-stage filter system 12 downstream of the vessel 10. The illustrated filter system 12 includes an upstream roughing filter in series with a downstream filter.

In the illustrated embodiment, water to be purified is fed to a gas conductor vessel 10 that is in the configuration of a tower. Located inside the vessel is a vertical divider 20 which separates the interior of the vessel into first and second chambers 22, 24. These are, respectively, an upflow chamber or zone 22 containing an upflow water column and a downflow chamber or zone 24 containing a return column. Water enters the upflow zone 22 through an upflow chamber water inlet 26, then flows upwardly to the top of the divider 20. The water then flows over a weir 28 at a top portion 29 of the divider 20 and into the return column 24. The weir 28 controls the flow rate. The water then flows downwardly through the second chamber 24 by gravity and leaves the tower 10 through an outlet 30 located at an elevation below the weir 28. The region 62 over the weir serves as an upflow chamber water outlet and a downflow chamber water inlet. The outlet of the first chamber 22 is thus at an elevation above the inlet 26 of the first chamber; and the inlet of the second chamber 24 is at an elevation above the second chamber's downflow chamber water outlet. One portion of the vessel 10 thus serves as an contact tower 60, sometimes referred to herein as an upflow tower with reference to the illustrated embodiment. A second portion of the vessel 10 serves as a return tower 61, sometimes referred to herein as a downflow tower with reference to the illustrated embodiment.

Water leaving the tower 10 through the outlet 30 is passed directly into a solids separation system. In the illustrated embodiment, the solids separation system is the filtration system 12 which includes an upflow clarifier device 34 provided in an upflow filter compartment defined by a vessel 35. The clarifier device 34 includes a bed 36 of particulate material or media that is retained beneath a screen 38 and that is buoyant in the water inside the vessel 35. The clarifier 34 is followed by a downflow filter 40, including a bed 41 of nonbuoyant particulate material or media, provided in a downflow filter compartment defined by a vessel 42. The vessels 35, 42 are provided by a rectangular tank which is separated by an internal upright wall 44. The vessels communicate via clarifier outlets 46, which also serve as inlets for the vessel 42. Examples of suitable solids separation systems can be seen in U.S. Pat. Nos. 4,547,286, 4,608,181 and 4,793,934 and in numerous other prior patents.

In a typical water treatment plant, water systems are provided in tandem. Therefore, when the filters in one system are being cleaned, the filters in the other are operational so that the plant continuously treats water. Such a second system is shown in broken lines at the back of FIG. 1.

The illustrated apparatus, as shown in FIGS. 2 and 3, includes an ozone delivery system for contacting ozone with water in the upright upflow or contact tower 60. A gas diffuser 52 serves as an inlet for ozone-containing gas 53 and is positioned to inject the gas into water in the column 22. The diffuser 52 is preferably located near the bottom of the column 22, either above or below the inlet 26. Most conveniently, the diffuser may be made of a porous ceramic material which facilitates the production of numerous small bubbles. Ozone is continuously supplied to the diffuser 52 via a supply line 54 which is connected to an ozone generator system 56. The rate of ozone injection is set so that the concentration of ozone in the column 22 does not exceed 3 ppm.

It should be appreciated that FIGS. 1–3 do not show the only suitable mechanical arrangement for contacting ozone with process water. For example, if it is necessary to treat water having an ozone demand greater than 3 ppm, the apparatus could comprise a single large vessel containing multiple vertical dividers that define multiple contact zones containing multiple columns of water. As shown in FIGS. 4–7 and discussed below, water can be directed to flow through various chambers, preferably in a serpentine path, upwardly and downwardly, while ozone is injected into more than one of the water columns. Also, although it is highly advantageous to use a unitary tower with one or more internal dividers as illustrated in FIGS. 1–3 and 7, multiple separate containers can be used to define plural chambers or zones for columns of water as shown in FIGS. 4–6. The flow direction pattern could be modified, e.g. so that water flows downwardly in a tower and then directly into a cooling vessel from the bottom of the tower; this would not be convenient for gas separation, but scavenger chemicals could be added to the water to react with any residual ozone.

The ozone generation equipment is of conventional design and may, for example, be assembled from OZOTEC brand equipment manufactured by Hankin Atlas Ozone Systems Ltd, Scarborough, Ontario, Canada. The ozone generator 56 includes a number of ozone production elements 58. In the illustrated embodiment, these elements are tubes that are made of stainless steel and that are electrically grounded. Each stainless steel tube surrounds an inner dielectric tube (not shown) so that there is a gap between the outer and inner tube. The inner tube is made of glass and is coated on its interior surface with an electrically conductive material. Ozone is generated by electrical discharge through dried air or oxygen that is pumped through the gap between the outer and inner tubes and, from there, to the diffuser 52.

During such generation of ozone, a considerable amount of heat is generated inside the ozone generator tubes. This heat is dissipated by positioning at least a portion of at least some of the tubes in the flow path of the water to be treated, such as in one of the chambers 22, 24 of the vessel 10, so that heat is transferred to the passing water.

The embodiment shown in the drawings is a particularly advantageous arrangement wherein the ozone generator tubes 58 are located inside a cooling vessel 70 and the cooling vessel has an inlet 72 that communicates with, and in the illustrated embodiment corresponds to, the outlet of the upright return tower 61. It will be appreciated that the ozone generator tubes could alternatively be positioned in the column of water 24 inside the return tower 61 or at other locations in the path of the water being purified. Although, it is advantageous for the ozone inlet 52 to be positioned upstream of ozone generation elements 58 in the water flow path.

From the drawing, it will be appreciated that the illustrated cooling vessel 70 is a lateral extension of the bottom region of the return tower 61. An opening in the wall which defines the second chamber 24 is also the inlet 72 for the cooling vessel 70. Because the opening is large in the illustrated embodiment, the walls of the return tower 61 and cooling vessel 70 can be said to define a single chamber that has a reservoir region 74 that corresponds to the portion of the return column 24 that is located above the top of inlet 72 and a cooling region 76 below the top of the inlet 72. The cooling vessel 70 also has an outlet which, in the illustrated embodiment, corresponds with the inlet 30 of the filtration system.

The illustrated cooling vessel 70 is particularly advantageous when used downstream of a chemical feed mechanism. It is common practice to add filtration-enhancing chemicals, particularly coagulants, to water which is to be filtered. These chemicals must be thoroughly mixed with water to have the best effect. The illustrated system includes a coagulant injection system. Water treatment chemicals, including coagulants, are added through inlet ports 78 upstream of the cooling vessel 70. The resulting mixture of water and chemicals must thus pass through the cooling vessel 70 prior to filtration. Inside the cooling vessel 70, the ozone generation tubes 58 are arranged in an array, such as the illustrated three rows of four tubes each, so that the combined water and chemicals flow in a tortuous pass through the generator tubes 58. The generator tubes thus serve as a static mixer which blends the injected chemicals with the water being treated, and the cooling vessel 70 thus also serves as a mixing vessel, with the inlet 72 serving as a mixing vessel inlet. After passing through the array of tubes 58, ozone-depleted coagulant-containing water flows through the outlet 30, which serves as the mixing vessel outlet, and into the filtration system 12 as previously mentioned.

A mixture of ozone and water is corrosive to mild steel. Accordingly, the tower apparatus 10, particularly the walls of the upflow column 22, are made of a corrosion resistant material such as stainless steel. It would be unduly expensive to make the entire apparatus of such a material. Accordingly, a mechanism is provided for removing ozone from the water before it enters the filtration stages of the system. In the illustrated embodiment, gas entrained in the process water is collected in a gas collection chamber or region 62, which is defined by substantially gas-tight walls at the top of the tower, before the water reaches the ozone generation elements 58. Gas, including any unreacted ozone, is removed via a gas collector system 63. The gas collector system includes a demister 64 which is connected to a catalytic off-gas destruction system (not shown). A pump (not shown) connected to the demister 64 maintains the gas separation region 62 at a slightly subatmospheric pressure to encourage the separation of gas from water at the tops of the columns 22, 24.

A detection system is provided to be sure that substantially all ozone is removed before water enters the filtration sections of the apparatus. This system can include a device 66, such as an OZOMETER brand residual ozone analyzer manufactured by Hankin Atlas, positioned to test water at a location downstream of the gas collection chamber 62 and then signal if the ozone content of the tested water exceeds a predetermined amount. A gas supply controller unit 67, including a device such as an OZOMICRO brand controller manufactured by Hankin Atlas, is adapted to respond to a signal from the ozone detector 66 and, in response to the signal, to reduce the rate of ozone injection through the diffuser 52 when the ozone content of the sampled water exceeds the predetermined amount. Most conveniently, this is accomplished by signaling the power supply of the controller unit 67 to reduce the electrical current supplied to the electrodes of the ozone generation elements 58. Reducing the current in turn reduces the percentage of ozone in the gas injected via the diffuser 52. Instead of using an ozone analyzer, gas removed via the demister can be tested for ozone content by an ozone analyzer 68. And, if the ozone content exceeds a predetermined amount, the gas supply controller 67 is signaled to reduce the rate of ozone injection. Other methods of testing for residual ozone can be used, and will be familiar to those who are experienced in this art.

The drawings show a tower that is much higher than other parts of the apparatus. This serves two purposes. It is beneficial for the upflow or contactor column 22 to be tall to ensure complete ozone contact. Having a tall return column 24 is helpful since it provides the hydraulic head necessary to drive the water, by gravity, through the downstream filtration system. To provide sufficient head, the height of the weir 28 is greater than the water levels required for operation of both the subsequent filtration stages 34, 40. In particular, the weir 40 is at a higher elevation than the upper surfaces 80, 81 of the beds 36, 41 of particulate media in both filter stages and is higher than the bottoms of the clarifier outlets 46.

For best operation, the surface 82 of water in the column 24 should be maintained within a predetermined elevation range. The surface 82 should be at a higher elevation than the tops of the beds 36, 41 of particulate media in both filter stages and should be higher than the bottoms of the clarifier outlets 46. The surface 82 should also be at least three inches below the top of the weir 28 so that water will fall freely for a distance after passing over the weir. The free falling water creates turbulence when it contacts the surface of water in the column 24. This agitation facilitates the release of gas from the water to the gas collection region 62 over the weir 28.

The level of water in the column 24 will rise as filter elements become clogged. Accordingly, an automatic apparatus is provided for sensing when the level of water in the column 24 exceeds a predetermined height. This apparatus can take a number of forms. In the illustrated embodiment, a float switch 84, provided near the top of the return column 24, serves as a level sensor. If the water in the return column rises to a height sufficient to trip the float switch, cleaning of the clarifier bed 36 will commence automatically in response. Other devices, such as pressure sensors (not shown), can be used for a similar task as the float switch 84. The cleaning mechanism for the clarifier 34 will advantageously include an air injection system 86 below the bed 36 of particulate material. When the sensor detects a condition of water in the return tower 61, which condition indicates that the level of the water column 24 exceeds the predetermined level, the sensor signals an electronic controller (not shown). The controller responds by operating fluid flow control valves to initiate cleaning, e.g. to initiate a flow of air into the air injection system 86.

To operate the illustrated apparatus, water that contains contaminants is directed to flow upwardly through the contact tower 60 while operating the ozone generation system to inject ozone via the diffuser 52.

At the top of the column 22, any residual ozone is separated from the water. At the top of the column 22 the surface of the water is in contact with gas that is maintained at a slightly subatmospheric pressure, preferably from one to four inches of vacuum, in the region 62. The negative pressure maintained in the separation region 62 urges separation of gasses from the water.

Periodically, measurements are taken to ensure that no appreciable amount of water-borne ozone enters the filter system 12. If more than a predetermined maximum amount of ozone is detected, the rate of ozone injection through the diffuser 52 is reduced.

After water reaches the top of the column 22, it flows over the weir 28 and then downwardly inside the return tower 61 where it joins a pillar 24 of water that provides a hydraulic head sufficient to drive water through downstream filtration units 34, 40 by gravity.

Before it enters the filtration units, water is passed through an array of ozone generation elements to cool the elements. In the illustrated embodiment, water passes through an array of ozone generation tubes 58. Filtration aids, particularly coagulants, are added at a location 78 upstream of the ozone generation tubes, so that the mixture of water and filter aids is agitated as it flows through the array of tubes. After agitation, the heated mixture of water and filter aid chemicals is passed through a vessel 35 containing a bed 36 of particulate material to separate solids from the water.

If during the filtering operation it is sensed that the water level in the return column 24 has exceeded a predetermined height, automatic cleaning of the filter bed 36 is commenced in response.

FIG. 4 illustrates another apparatus for water treatment. The vessel of FIG. 4 has four containers 104, 105, 106, 107 that define four chambers 122, 134, 142, 150 upstream of a solids separation system 112. For ease of construction, the containers are vertically extending cylinders of circular or polygonal cross-sections, although other tower-type containers will work. The chambers communicate via pipes 130, 138, 146.

Water to be purified is fed into a first upflow chamber 122 from a water inlet 126. From the inlet, water flows upwardly through chamber 122 and exits via an outlet 128. Water leaving the outlet 128 flows through the pipe 130 to an inlet 132 of a downflow chamber 134. Water flows downwardly through the downflow chamber 134 and exits through an outlet 136, into and through the pipe 138, to an inlet 140 near the bottom of an upflow chamber 142. Water flows upwardly through the upflow chamber 142 to an outlet 144, through the pipe 146 and through an inlet 148 of a final downflow chamber 150. Water leaves the downflow chamber 150 via an outlet 152 and travels via a pipe 154 to an inlet 156 which connects to the water distribution mechanism (not shown) of the solids separation system 112.

In FIGS. 4–7, the solids separation systems are shown in rough schematic form. Such systems may be of the type previously described with reference to FIGS. 1–3, and may include a cooling/mixing stage of the type shown at 70 in FIGS. 1–3. Other features of the apparatus shown in FIGS. 1—3, as described above, can also be included in the embodiments of FIGS. 4–7.

An ozone supply system is provided for contacting ozone from an ozone source 166 with water inside three of the chambers. Ozone can be mixed with water upstream the chamber 122 so that a mixture of water and ozone enters the chamber 122 via the pipe 126. But, FIG. 4 shows an advantageous arrangement wherein diffusers 158, 160, 162 are provided in chambers 122, 134, 142 to inject ozone into water inside those chambers, preferably near the bottom of the chambers. Ozone is supplied to the diffusers via supply lines 164 which extend from an ozone source 166.

Lids 168, 170, 172 and 174 cover the containers 104, 105, 106, 107 to provide substantially gas-tight walls which define gas collection chambers 176, 178, 180, 182 above water inside the water flow chambers 122, 134, 142, 150. Each water flow chamber 122, 134, 142, 150 has its own gas collection chamber 176, 178, 180 and 182, respectively.

Gases are removed from the gas collection chambers via a gas collector system represented schematically by pipes 184, 186, 188 and 190 which are connected to a common header 194. A blower, not shown, draws gas from the chambers 176, 178, 180, 182 into the header 194 and transports the gas to an ozone destruction system, not shown. This gas collector system operates so that substantially no ozone remains present in water that passes through the outlet 152.

Chemical additives can be added as needed to facilitate operation. Ozone scavenger chemicals can be added to the water to react with any residual ozone. Such scavenger chemicals are best added in the last chamber 150 from which ozone is removed. To assure good mixing, a scavenging chemical should be added in an area of water turbulence such as through an inlet 292 near the water flow inlet 248. Alternatively, a scavenging chemical could be injected through a side inlet into the pipe 246. Other chemicals, such as filtration aids, are conveniently injected just upstream of the solids separation system 112 and any mixing stage. In FIG. 4 such chemicals can be delivered through a supply line 192.

In operation, the device of FIG. 4 works similarly to the device of FIGS. 1–3, except that water passes through multiple chambers instead of just two.

FIG. 5 shows yet another embodiment. In this embodiment a vessel 210 contains similar chambers to those shown in the embodiment of FIG. 4. In FIG. 5, corresponding elements are identified by the same reference numbers as in FIG. 4, incremented by 100. It is a difference in the system of FIG. 5 that the first upflow chamber 222 is open at the top. By this arrangement, no ozone is combined with water upstream of the chamber 234. Instead, all ozone injections are made through diffusers 260, 262 inside chambers 234, 242.

The apparatus of FIG. 6 is similar to that of FIGS. 4 and 5, except that it includes only three water flow chambers 334, 342, 350 which correspond generally to the three downstream chambers of the devices shown in FIGS. 4–5. In FIG. 6, corresponding elements are identified by the same reference numbers as in FIG. 4, incremented by 200.

The embodiment of FIG. 7 is more closely related to the embodiment of FIGS. 1–3 in that the water flow path is defined by a baffle system inside the walls of a unitary vessel. The device of FIG. 7 includes five water flow chambers 421, 422, 434, 442, 450. A single gas collection chamber 463 is located above all five of the water flow chambers 421, 422, 434, 442, 450.

Having described preferred embodiments of the invention, it should be understood by one skilled in the art that one can deviate from the preferred elements of the invention and still be within the concept of the invention described herein.

We claim:

1. An apparatus for treating water which contains contaminants, the apparatus comprising:
   a first chamber having a water inlet and outlet;
   a second chamber having a water inlet and outlet, the second chamber being downstream of the first chamber and in communication therewith such that water is permitted to flow from the outlet of the first chamber to the inlet of the second chamber;
   an ozone generator system for combining ozone with water such that ozone is contained in water inside at least one of the chambers, the ozone generator system comprising plural elongated ozone production elements, at least some of the elements being disposed in one of the chambers; and
   a solids separation system positioned to receive water from the outlet of the second chamber.

2. An apparatus for treating water which contains contaminants, the apparatus comprising:
   a gas contactor vessel that defines an inlet for water to be treated, an outlet for treated water, and a gas collection chamber to contain a volume of gas above water inside the vessel;
   an ozone source;
   an ozone delivery system connected to the ozone source, which delivery system operates to combine ozone gas with the water inside the vessel at an elevation below the surface of the water such that ozone is contained in the water; and
   a gas collector which maintains the volume of gas at a subatmospheric pressure which is sufficiently low to induce the release of ozone from the water inside the vessel.

3. An apparatus for treating water which contains contaminants, the apparatus comprising:
   an ozone generator system comprising plural ozone generation elements;
   a mixing vessel having a mixing vessel inlet for water to be treated and a mixing vessel outlet, at least some of the elements being disposed in an array inside the mixing vessel, the array being configured to act as a static mixer for liquid passing through the vessel;
   a coagulant injection system for delivering coagulant chemicals into the water upstream of the array of elements so that mixing of the chemicals with the water is enhanced by agitation that results as the water passes through the array of elements; and
   a solids separation system connected to the mixing vessel outlet to receive coagulant-containing water from the vessel.

4. A method of treating a continuous flow of water which contains contaminants, the method comprising:
   directing the flow of water to pass through a gas contactor vessel;
   delivering ozone into the passing flow of water in the vessel in such a manner that the ozone mixes with the water;
   separating ozone from the resulting mixture of water and ozone;
   after the separating, measuring the amount of ozone in the ozone-depleted water to determine whether the amount of ozone remaining exceeds a predetermined amount;
   reducing the amount of ozone being delivered if the amount of ozone remaining exceeds the predetermined amount; and
   passing the mixture of ozone-depleted water through a solids separation system.

5. A method of treating a continuous flow of water which contains contaminants, the method comprising:
   directing the flow of water to pass upwardly through an upflow chamber that has an upflow chamber water inlet and an upflow chamber water outlet at an elevation above the upflow chamber water inlet;
   directing the flow of water to pass downwardly by gravity through a downflow chamber that has a downflow chamber water inlet and a downflow chamber water outlet at an elevation below the inlet, the chambers being joined in such a manner that water flows from the water outlet of one of the chambers to the water inlet of the other chamber;

combining ozone gas with water such that ozone is contained in water that is inside at least one of the upflow and downflow chambers;

after water has passed through the upflow and downflow chambers, directing the water so that it flows upwardly by gravity through a bed of particulate material to separate solids from the water;

sensing a condition of water in the downflow chamber to determine when the level of the water in the downflow chamber exceeds a predetermined height; and cleaning the bed when the level of the water exceeds the predetermined height.

* * * * *